(12) United States Patent
Xia et al.

(10) Patent No.: US 8,609,270 B2
(45) Date of Patent: Dec. 17, 2013

(54) IRON-SULFIDE REDOX FLOW BATTERIES

(75) Inventors: Guan-Guang Xia, Pasco, WA (US);
Zhenguo Yang, Richland, WA (US);
Liyu Li, Richland, WA (US); Soowhan Kim, Richland, WA (US); Jun Liu, Richland, WA (US); Gordon L. Graff, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 237 days.

(21) Appl. No.: 13/071,688

(22) Filed: Mar. 25, 2011

(65) Prior Publication Data
US 2012/0244406 A1    Sep. 27, 2012

(51) Int. Cl.
*H01M 4/36* (2006.01)
*H01M 4/48* (2010.01)
*H01M 4/20* (2006.01)

(52) U.S. Cl.
USPC ............................ 429/107; 429/101; 429/105

(58) Field of Classification Search
None
See application file for complete search history.

(56) References Cited

U.S. PATENT DOCUMENTS

| | | | |
|---|---|---|---|
| 3,920,474 A | | 11/1975 | Zito, Jr. et al. |
| 4,180,623 A | | 12/1979 | Adams |
| 5,422,197 A | * | 6/1995 | Zito ............................ 429/51 |
| 7,557,485 B1 | * | 7/2009 | Lynch et al. ................ 310/248 |
| 2001/0028977 A1 | * | 10/2001 | Kazacos et al. ............. 429/105 |
| 2006/0063065 A1 | * | 3/2006 | Clarke et al. ................ 429/105 |
| 2010/0227204 A1 | | 9/2010 | Zito | |

OTHER PUBLICATIONS

Zhou, Hantao, et al., "A comparative study of carbon felt and activated carbon based electrodes for sodium polysulfide/bromine redox flow battery," Electrochimica Acta, 2006, 6304-6312 pages, vol. 51, Elsevier, PR China.

International Search Report/Written Opinion for International Application No. PCT/US2011/063404, International Filing Date Dec. 6, 2011, Date of Mailing Sep. 28, 2012.

\* cited by examiner

*Primary Examiner* — Ula C Ruddock
*Assistant Examiner* — Scott J Chmielecki
(74) *Attorney, Agent, or Firm* — Allan C. Tuan

(57) ABSTRACT

Iron-sulfide redox flow battery (RFB) systems can be advantageous for energy storage, particularly when the electrolytes have pH values greater than 6. Such systems can exhibit excellent energy conversion efficiency and stability and can utilize low-cost materials that are relatively safer and more environmentally friendly. One example of an iron-sulfide RFB is characterized by a positive electrolyte that comprises Fe(III) and/or Fe(II) in a positive electrolyte supporting solution, a negative electrolyte that comprises $S^{2-}$ and/or S in a negative electrolyte supporting solution, and a membrane, or a separator, that separates the positive electrolyte and electrode from the negative electrolyte and electrode.

15 Claims, 2 Drawing Sheets

IRON-SULFIDE REDOX FLOW BATTERIES

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

A redox flow battery (RFB) stores electrical energy in reduced and oxidized species dissolved in two separate electrolyte solutions. The negative electrolyte and the positive electrolyte circulate through cell electrodes separated by an ion exchange membrane or a separator. Redox flow batteries are advantageous for energy storage because they are capable of tolerating fluctuating power supplies, repetitive charge/discharge cycles at maximum rates, overcharging, overdischarging, and because cycling can be initiated at any state of charge.

However, among the many redox couples upon which redox flow batteries are based, a number of disadvantages exist. For example, many systems utilize redox species that are unstable, are highly oxidative, are difficult to reduce or oxidize, precipitate out of solution, and/or generate volatile gases. In many ways, the existing approaches to addressing these disadvantages have been ad hoc and can include the imposition of restrictive operating conditions, the use of expensive membranes, the inclusion of catalysts on the electrodes, and/or the addition of external heat management devices. These approaches can significantly increase the complexity and the cost of the total system. While some redox couples, such as those involving vanadium, can eliminate the need for some of these ad hoc approaches, they often utilize highly acidic solutions and/or expensive materials. Therefore, a need for improved redox flow battery systems exists.

SUMMARY

The present invention includes iron-sulfide redox flow battery systems for energy storage. The systems demonstrate excellent energy conversion efficiency and stability and utilize low-cost materials that are relatively safer and more environmentally friendly. One embodiment of the redox flow battery systems is characterized by a positive electrolyte that comprises Fe(III) and/or Fe(II) in a positive electrolyte supporting solution, a negative electrolyte that comprises $S^{2-}$ and/or S in a negative electrolyte supporting solution, and a membrane, or a separator, that separates the positive electrolyte and electrode from the negative electrolyte and electrode. An exemplary membrane, or separator, can include, but is not limited to, a sulfonate tetrafluoroethylene-based fluoropolymer-copolymer. Alternatively, the membrane, or separator, can comprise a hydrocarbon.

In preferred embodiments, the concentrations of the Fe(II), the Fe(III), or both are greater than 0.2 M and/or the concentrations of the $S^{2-}$, the S, or both are greater than 0.1M.

The positive and negative electrolyte supporting solutions preferably have pH values greater than or equal to 6. The use of supporting solutions that are basic can be advantageous because they will not corrode components of the battery system in which they are utilized. Exemplary supporting solutions can comprise alkali metal hydroxides, ammonium hydroxide, or both. In a particular embodiment, the positive electrolyte can comprise potassium ferricyanide, potassium ferrocyanide, or both. The negative electrolyte can comprise a polysulfide compound.

Embodiments of the RFB systems can further include electrodes comprising carbon. Preferably, the carbon electrodes comprise graphite felt. The electrodes can also comprise a partial or complete coating having a catalyst such as Ni and/or Co. Alternatively, the electrodes can comprise noble metals. Exemplary noble metal electrodes include any form of Ni, Co, Au, Pt, and stainless steels.

In preferred embodiments, the cell temperature of the system is between between −10° C. and 60° C. during operation. Furthermore, during operation, the state-of-charge condition is greater than 0% and less than 100%.

In a particular embodiment, the redox flow battery system is characterized by a positive electrolyte comprising $K_4F(CN)_6$, $K_3F(CN)_6$, or both and NaOH. The negative electrolyte comprises $S^{2-}$, S, or both and NaOH. A membrane, or a separator, separates the positive electrolyte and negative electrolyte. At least a portion of the S is arranged as sodium polysulfide.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode as well as other embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
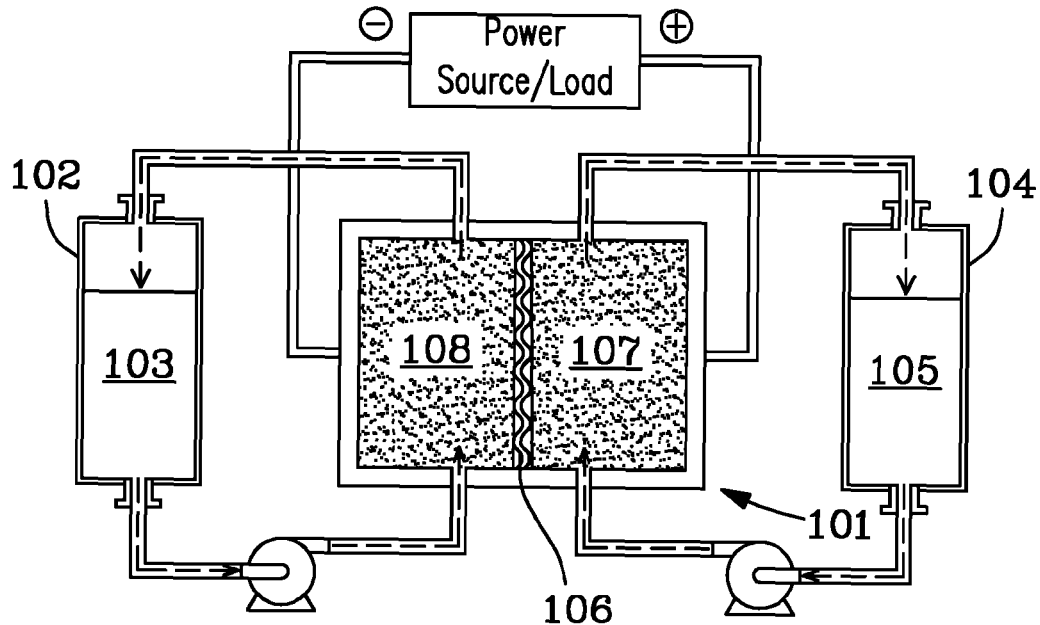
FIG. 1 is a diagram depicting one embodiment of a redox flow battery system according to the present invention.

FIGS. 1-4 show a variety of embodiments and aspects of the present invention. Referring first to FIG. 1, a diagram depicts one embodiment of a redox flow battery system. Positive electrolyte 105 and negative electrolyte 103 are delivered to an electrochemical cell 101 from storage tanks 102 and 104. The positive electrolyte comprises Fe(II) and/or Fe(III) and the negative electrolyte comprises $S^{2-}$ and/or S. The electrolytes in the electrochemical cell are separated by a membrane or a separator 106. During discharge, the Fe(III) will be reduced to Fe(II) on the positive electrode 107, while the $S^{2-}$ will be oxidized into elemental S on the negative electrode 108. Ions can pass through the membrane, or separator, for charge transportation and compensation. The process can be reversed during charging. Alternatively, spent electrolytes can be replaced.

Figure 2:
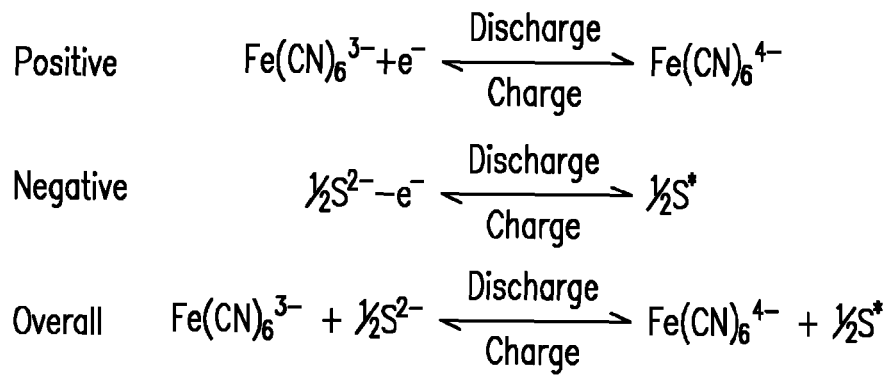
FIG. 2 depicts the simplified redox reaction and their corresponding standard potentials according to one embodiment of the present invention.

FIG. 2 includes simplified redox reactions for a particular embodiment, wherein the positive electrolyte comprises 1M potassium ferricyanide [$K_3Fe(CN)_6$] and a 0.1M sodium hydroxide (NaOH) supporting solution while the negative electrolyte comprises 2M sodium sulfide in 1M NaOH supporting solution. The two flowing redox solutions were separated by a sulfonated tetrafluoroethylene based fluoropolymer-copolymer (e.g., Nafion™) membrane. The system further comprised a positive electrode (pre-treated carbon or graphite felt), and a negative electrode (Ni or Co coated carbon or graphite felt) in an electrochemical cell. Typically, during discharge, the elemental S will dissolve in the excess sodium sulfide ($Na_2S$) basic solution and form a sodium polysulfide ($Na_2S_n$) solution. The $Na^+$ (or some $K^+$ and $OH^-$) will pass through the Nafion™ membrane for charge transportation and compensation.

Figure 3:
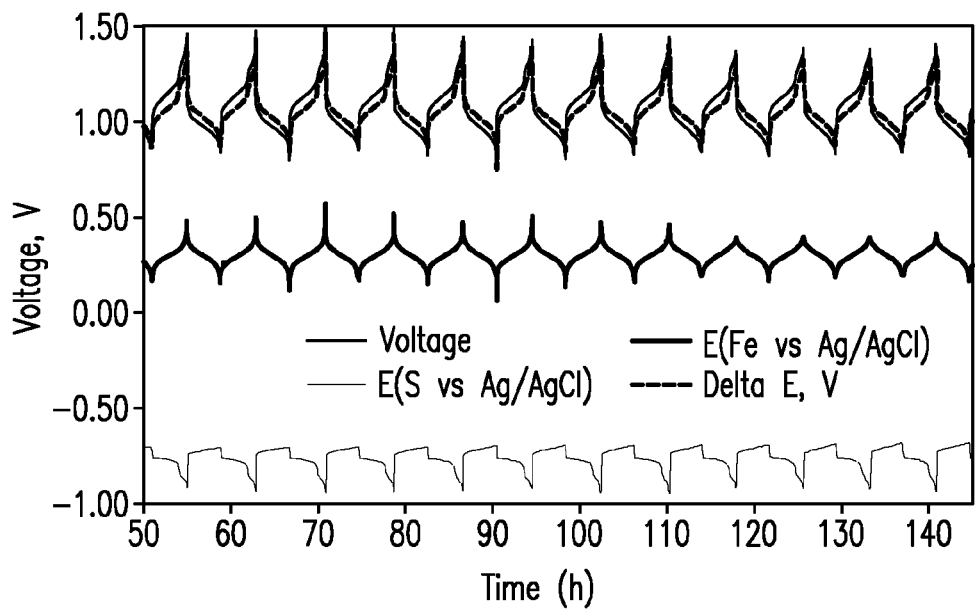
FIG. 3 is a graph of cell voltage and individual electrode potential (vs. 1M Ag/AgCl reference electrode) during charge-discharge cycles for one embodiment of a Fe-polysulfide RFB.

FIG. 3 includes data from the particular embodiment above showing charge-discharge cycles with the corresponding polarization curves of the positive and the negative potentials vs. Ag/AgCl (1M) reference electrodes, respectively. The absolute values of the actual cell voltage minuses the potential difference between the two electrodes during charging and discharging are the ohmic losses due to the electrical resistances of the membrane and the solutions (the dish line in FIG. 3). The redox reaction between $Fe(CN)_6^{3-}$ and $Fe(CN)_6^{4-}$ was rather reversible on the positive electrode (graphite felt) during a charge-discharge cycle, while the polysulfide solution showed a higher polarization behavior during the late stages of charging. This can be attributed to the low reduction activity of element S and its concentration polarization on the negative electrode (Co/graphite felt). The latter can be improved by modifying the negative electrode and adding appropriate amount of S into the initial $Na_2S$ solution.

Figure 4:
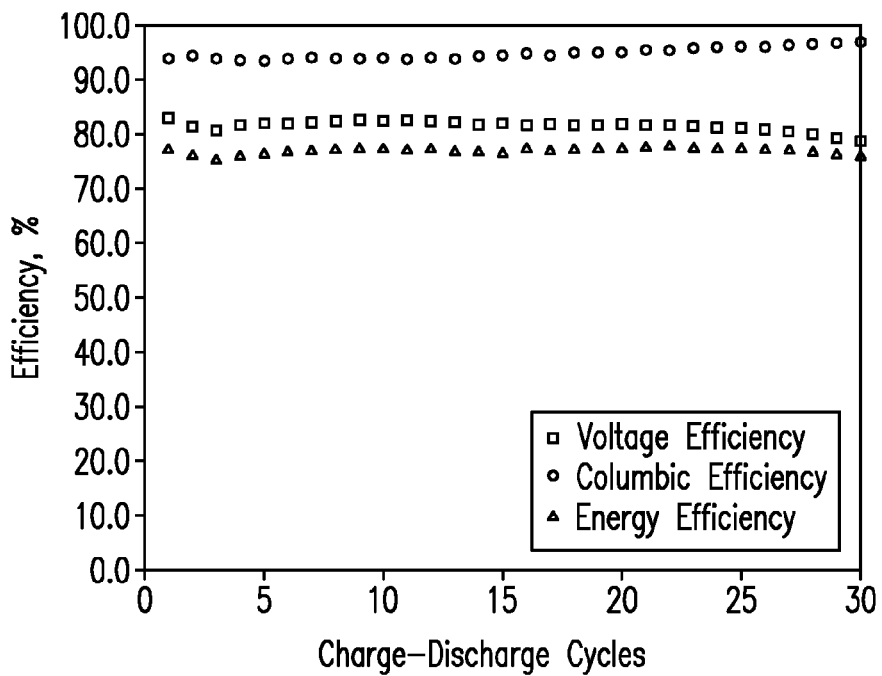
FIG. 4 is a graph of efficiencies of one embodiment of the present invention as a function of charge-discharge cycles.

Referring to FIG. 4, the columbic efficiency of the same embodiment was over 93% and the energy efficiency was over 75%. These values are comparable to the state-of-art bromide-polysulfide flow battery system.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A redox flow battery system comprising a positive electrolyte comprising Fe(III) and Fe(II) in a positive electrolyte supporting solution, a negative electrolyte comprising $S^{2-}$ and S in a negative electrolyte supporting solution, and a membrane or a separator separating the positive electrolyte solution and electrode from the negative electrolyte solution and electrode, wherein the positive electrolyte comprises potassium ferricyanide, potassium ferrocyanide, or both.

2. The system of claim 1, wherein concentrations of the Fe(II) and Fe(III) are greater than 0.2 M.

3. The system of claim 1, wherein concentrations of the $S^{2-}$ and S are greater than 0.1M.

4. The system of claim 1, having a cell temperature between −10° C. and 60° C. during operation.

5. The system of claim 1, wherein the positive electrolyte and negative electrolyte supporting solutions comprise alkali metal hydroxide, ammonium hydroxide, or both.

6. The system of claim 1, wherein the negative electrolyte comprises a polysulfide compound.

7. The system of claim 1, having a state-of-charge condition greater than 0% and less than 100% during operation.

8. The system of claim 1, wherein the electrodes comprise carbon.

9. The system of claim 8, wherein the carbon electrodes comprise graphite felt.

10. The system of claim 8, wherein the carbon electrodes further comprise a Ni coating or a Co coating.

11. The system of claim 1, wherein the electrodes comprise noble metals.

12. The system of claim 11, wherein the noble metal electrodes comprise a metal selected from the group consisting of Ni, Co, Au, Pt, and stainless steels.

13. The system of claim 1, wherein the membrane or the separator comprises a sulfonated tetrafluoroethylene based fluoropolymer-copolymer.

14. The redox flow battery system of claim 1, wherein the positive electrolyte and negative electrolyte supporting solutions are both basic solutions.

15. A redox flow battery system characterized by:
a positive electrolyte comprising $K_4Fe(CN)_6$, $K_3Fe(CN)_6$, or both and NaOH;
a negative electrolyte comprising $S^{2-}$ and S and NaOH; and
a membrane or a separator separating the positive electrolyte and negative electrolyte, wherein at least a portion of the S is arranged as sodium polysulfide.

* * * * *